(12) United States Patent
Norrkniivilä et al.

(10) Patent No.: US 6,313,599 B2
(45) Date of Patent: Nov. 6, 2001

(54) METHOD FOR CONTROLLING AN INVERTER

(75) Inventors: Mikko Norrkniivilä, Masala; Samuli Heikkilä, Helsinki, both of (FI)

(73) Assignee: ABB Industry Oy, Helsinki (FI)

( * ) Notice: Subject to any disclaimer, the term of this patent is extended or adjusted under 35 U.S.C. 154(b) by 0 days.

(21) Appl. No.: 09/760,787

(22) Filed: Jan. 17, 2001

(30) Foreign Application Priority Data

Jan. 18, 2000 (FI) .................................................. 20000098

(51) Int. Cl.$^7$ ...................................................... H02P 21/00
(52) U.S. Cl. ............................. 318/722; 318/801; 363/40
(58) Field of Search ................................... 318/722, 801; 363/40

(56) References Cited

U.S. PATENT DOCUMENTS

| | | | |
|---|---|---|---|
| 4,767,976 | * 8/1988 | Mutoh et al. | 318/808 |
| 5,448,150 | * 9/1995 | Yamamoto et al. | 318/805 |
| 5,475,293 | * 12/1995 | Sakai et al. | 318/802 |
| 5,629,598 | * 5/1997 | Wilkerson | 318/808 |

* cited by examiner

Primary Examiner—Bentsu Ro
(74) Attorney, Agent, or Firm—Dykema Gossett PLLC

(57) ABSTRACT

A method for controlling an inverter which comprises the switching components to be controlled, the method comprising the steps of determining a current vector ($\bar{i}_{olo}$) for the inverter output; determining a flux vector ($\bar{\psi}$) for the inverter load; determining an angular speed ($\omega$) for the inverter load; determining a resistance (R) for the inverter load. The method further comprises the steps of determining a voltage vector ($\bar{b}$) as a sum of the product of the inverter load resistance (R) and the output current vector ($\bar{i}_{olo}$) and a voltage proportional to the electromotive force of the load; forming a direction vector ($\bar{S}$) on the basis of a current vector ($\bar{i}_{ref}$) for the inverter reference value and the inverter output current vector ($\bar{i}_{olo}$); determining a space coordinate system $\mu\upsilon$ associated with the voltage vector ($\bar{b}$) and having a real axis $\mu$ which is co-directional with the voltage vector ($\bar{b}$); determining the direction vector ($\bar{S}$) in the $\mu\upsilon$ coordinates system; and forming inverter switch commands on the basis of a component ($\bar{S}_\mu$) co-directional with the $\mu$ axis of the direction vector ($\bar{S}$) and a component ($\bar{S}_\upsilon$) co-directional with the $\upsilon$ axis.

5 Claims, 2 Drawing Sheets

METHOD FOR CONTROLLING AN INVERTER

BACKGROUND OF THE INVENTION

The present invention relates to a method for controlling an inverter which comprises the switching components to be controlled, the method comprising the steps of determining a current vector for the inverter output; determining a flux vector for the inverter load; determining an angular speed for the inverter load; and determining a resistance for the inverter load.

Inverters are used for transferring power between DC and AC circuits. In a voltage-controlled inverter, DC voltage is typically converted to AC voltage by using semiconductor power switches. Depending on the structure of the inverter employed, AC voltage consists of voltage pulses of one or more levels because the switches have only two states, a conductive one and a blocking one. The output voltage of the inverter is generated by applying modulation, and a modulator is a device used for forming the inverter switch position commands at a given moment.

Most AC applications have an active voltage source on the AC voltage side, the voltage source usually comprising one or more rotating electric machines. An electric network can also be described using an equivalent generator, because the voltage in the network consists of voltage generated by several generators together. The operation of rotating electric machines is based on a magnetic flux generated in a stationary stator and a rotating rotor. The term often used in connection with electric machines is "coil flux", fluxes being usually generated, irrespective of the type of the machine, from currents flowing in coils. Alternatively, either the stator flux or the rotor flux can also be generated using permanent magnets. The electromagnetic state of electric machines is determined by the flux and the torque of the machine.

A multi-phase system is currently analysed almost without exception with space vectors. A vector formed of phase variables and presented as a complex number allows the machine to be controlled as an entity, instead of separate phase-specific adjustments. Space vectors can be shown using either their real or imaginary portions, or, alternatively, their length and phase angle. The vectors rotate in relation to a stationary reference coordinate system, i.e. the real and imaginary axes of a complex plane, at an angular speed $\omega$ determined by frequency. Instead of stationary reference coordinate system, the calculation is often carried out using a coordinate system rotating at a specific speed. For example, in a coordinate system rotating at the angular speed $\omega$, ordinary AC variables are shown as direct components, the control thus being simple to implement.

The control or adjustment of rotating machines, i.e. those forming a rotating field, is based on making the control of torque and flux independent of each other. The control of the flux aims at maintaining a desired length for the flux vector of the air gap formed by the stator, the rotor, or a combination thereof in the air gap between the rotor and the stator, i.e. at a constant in a normal situation. The torque, in turn, is proportional to the angle between the stator and rotor flux vectors.

The main purpose of network inverters is to maintain the power transferred between DC and AC circuits at a desired level by controlling the effective power and the idle power separately. The network inverter is controlled in order to provide sinusoidal phase currents, which reduces harmonic waves in the network current.

The modulation of inverters is most often based either on pulse width modulation (PWM) or on two-point control. In pulse width modulation the switch position commands are formed using a separate PWM modulator, which receives the amplitude and frequency command for the output voltage from a higher control level of the inverter. In its simplest form, pulse width modulation can be carried out in a phase-specific manner on the basis of a sine-triangle comparison. By comparing sinusoidal phase voltage commands of a desired frequency and amplitude with a triangular carrier wave, an output voltage formed of voltage pulses is obtained, the average of the voltage changing sinusoidally. Instead of a phase-specific implementation, the PWM modulator can also be implemented using vector modulation based on the space vector of the output voltage. However, the main weakness of a separate PWM modulator is that the control is slow.

Another commonly applied principle is to modulate the inverter by using two-point control. When two-point controllers are used, the modulation is formed as a by-product of the control algorithm to be used, without a separate modulator. Depending on the variable to be controlled, each turn of the switch is made either on the basis of a real value calculated directly on the basis of either a measured variable or measured variables. The operational principle of the two-point control is to keep the real value always close to the reference value. Whenever needed, the switches are turned so that the real value again starts to approach the reference value. In the simplest case the switches are turned directly on the basis of whether the real value is lower or higher than the reference value. In addition, a specific variation range, or hysteresis, accepted for the real value is often determined around the reference value, the switches being then turned only when the deviation of the real value from the reference value exceeds the accepted range of variation. Hysteresis thus allows the number of switch turns needed to be reduced. The only requirement set to two-point control is that every switch control action changes the value of the variable to be controlled to the right direction.

The currently employed inverter modulation methods based on the use of two-point controllers can be divided into different two-point controls of current and to direct control of torque. The most simple method to implement two-point control of current is a phase-specific control. The controllers are typically provided with sinusoidally varying phase current commands with which the measured phase currents are then compared. The main problem in phase-specific implementation is that the star point is usually not connected in applications employing inverters. In other words, the phase currents are not independent of each other, and the phase current may change even if the switches associated with the phase concerned were not turned. For this reason, current control is preferably carried out by controlling the space vector formed of phase currents because the currents can then be controlled as an entity.

In direct control of torque the flux of the machine and its torque are controlled directly in a stationary coordinate system associated with the stator coils. The flux control aims at maintaining the absolute value of the stator flux at a constant, and the torque is controlled by controlling the speed of rotation of the stator flux. Each turn of the switch is performed on the basis of the instantaneous values of the flux and the torque. Next, the voltage vector to be used, i.e. a specific combination of the inverter switch positions, is selected using the two-point controllers such that the stator flux and the torque remain within the hystereses defined around the reference values.

The change in the magnetic flux with respect to time is known to induce voltage. In connection with electric machines, a change in the flux vector thus induces in the coils a counter-electromotive force $\bar{e}$, which can be mathematically expressed as a time derivative of the flux vector ω using the following equation:

$$\bar{e} = \frac{d\bar{\psi}}{dt}. \tag{1}$$

As already stated above, space vectors can be represented with their length and phase angle. The following equation is obtained for the flux vector:

$$\bar{\psi} = \psi e^{j\omega t}, \tag{2}$$

where ψ=flux length, i.e. an absolute value
ω=angular speed
t=time
e=neper (≈2.718)
j=imaginary unit (=√−1)

The vector length and the phase angle are both functions of time, the derivative rule of product thus producing the following equation for $\bar{e}$:

$$\bar{e} = \frac{d\psi}{dt} e^{j\psi t} + j\omega \psi e^{j\omega t} = \frac{d\psi}{dt} e^{j\omega t} + j\omega\bar{\psi}. \tag{3}$$

The first term in equation (3) is called a transformer voltage and the second term a motion voltage. A transformer voltage having the same direction as the flux vector has an impact on the absolute value of the flux, and the motion voltage perpendicular to the flux has an impact on the rotation of the flux. The actual coil voltage vector $\bar{u}$ is obtained by adding to the electromotive force $\bar{e}$ also a resistive loss component proportional to the coil current.

Current control is usually carried out in a field coordinate system, i.e. the calculation is performed in a coordinate system associated with a flux vector of the machine and therefore rotating with the flux vector. Since the currents flowing in the coils of the electric machine form the machine's flux and its torque, by dividing the current vector into components in the field coordinate system, the impact of the current on the flux can be separate from its impact on the torque. The real axis of the field coordinate system that is has the same direction as the flux is commonly called the d-axis and the imaginary axis perpendicular to the flux is called the q-axis. Depending on the flux vector selected as the basis of the coordinate system, the control is stator-flux-, rotor-flux- or air-gap-oriented.

Since the flux can be expressed as a product of inductance and current, the current component having the same direction as the flux, i.e. the d-axis, is used for controlling the absolute value of the flux. The q-component perpendicular to the flux is used for controlling the torque because according to equation (3) this has an impact on the speed of rotation of the flux, i.e. on the angle between the flux vectors. On the other hand, depending on the application, the control that is co-directional with the flux, i.e. the control of magnetization, can be thought of as control of idle power, the control of the torque being proportional to the control of real power. The field coordinate system thus allows reference values to be easily produced for the current vector components providing the desired flux and torque or, alternatively, the desired idle and real powers. The difference between the vector components of the real value of current generated on the basis of measured phase currents and their respective reference values thus shows the direction into which the current is to be changed to achieve the reference values.

In methods based on two-point control of the space vector components, the positions of the inverter switches are selected on the basis of a selection table. Output voltage corresponding to a specific combination of inverter switch positions can be illustrated with a voltage vector of a specific length and angle. Various criteria are applied to set up the selection table and to select the switch position, but naturally the methods all aim at obtaining an output voltage that always changes the actual values to the desired direction.

Inductive inverter loads containing an active voltage source can be provided with an equivalent circuit shown in FIG. 1. When the direction of the current shown in the Figure is defined to be positive, the voltage of the equivalent connection circuit can be expressed with the following equation:

$$\bar{u} = R\bar{i} + L\frac{d\bar{i}}{dt} + \bar{e}. \tag{4}$$

The counter-electromotive force $\bar{e}$ comprises the primary inductance of electric machines, but a separate inductance L allows the stray inductance of the machines to be taken into account. When a network inverter is concerned, the inductance L is used for describing the inductance of a network filter between the inverter and the network.

Equation (4) allows the direction of change of the current to expressed with the following equation:

$$L\frac{d\bar{i}}{dt} = \bar{u} - (R\bar{i} + \bar{e}) = \bar{u} - \bar{b}, \tag{5}$$

where new voltage vector $\bar{b}$ is defined. The counter-electromotive force $\bar{e}$ can be expressed with equation (3). In most cases the calculation can be simplified, without causing any major error, by leaving out the portion of the conversion voltage. When electric machines are concerned, the inverter is generally used in an attempt to maintain the absolute value of the flux at a constant as described above, and since the network voltages providing the load of network inverter applications normally remain almost constant, the change in the absolute value of the flux is zero in any case. Consequently, the following equation is valid for vector $\bar{b}$:

$$\bar{b} = R\bar{i} + \bar{e} \approx R\bar{i} + j\omega\psi. \tag{6}$$

According to equation (5), the current in the circuit thus turns into the direction defined by the difference between the inverter output voltage $\bar{u}$ and the defined vector $\bar{b}$.

FIG. 2 illustrates the behavior of current vector $\bar{i}$ and voltage vector $\bar{b}$ with regard to the field coordinate system at different operating points of the machine, i.e. at different loads and speeds. The ω and T axes, which are drawn with thicker lines in the Figure, divide the examination into four different quadrants of operation. In quadrants I and III the machine operates as a motor having a positive power (P=ωT>0). In quadrants II and IV, where the torque and the angular speed have different signs, the power is negative and the machine thus operates as a generator.

The behavior of the current and voltage vectors, i.e. vectors $\bar{i}$ and $\bar{b}$, in the different quadrants is illustrated with respect to the field coordinate system. FIG. 2 assumes that the flux control maintains the absolute value of the flux at a constant, whereby the d component that has the same direction as the current's flux is kept approximately at a constant. The component perpendicular to the current's flux, i.e. the torque-producing component, is in turn increased as the load increases, which causes current vector ī to turn to the direction of the arrow when the absolute value |T| of the torque increases.

With regard to vector b̄, the Figure shows the greatest possible turning angle in the different quadrants. Electric machines usually have a relatively low resistance and therefore the resistive loss component is significant only at low speeds of rotation. At zero frequency, the voltage generated according to equation (6) has the same direction as the current and when the absolute value |ω| of angular speed increases, vector b̄ turns to the direction shown by the arrow. The increase in speed finally leads to a situation where the resistive voltage component in relation to the motion voltage is non-existent, vector b̄ being thus perpendicular to the flux, in accordance with the motion voltage.

Current methods, where two-point control operations are carried out on the basis of the comparisons made between the reference values and the real values of the current's d- and q-components, allow the direction to which the current should be changed with regard to the field coordinate system to be defined. A problem that arises is, however, that the direction of the current depends specifically on vector b̄, as shown by equation (5), the magnitude and direction of which is in turn strongly dependent on the machine's operating point, as shown in FIG. 2.

Comparisons of two-point controls carried out directly in the dq coordinate system therefore lead to highly complex conditions for the selection of the output voltage and, thereby, inverter switch positions. To allow the inverter output voltage to be selected so that it always changes the current to the desired direction at the different operating points of the machine, the modulation method applied has to be changed depending on speed and load. However, increased number of alternatives also means increased time of execution, which renders the equipment more complex and also adds to costs. Therefore the methods generally applied are usually compromises which operate optimally in some operating points only.

The above described problems also concern two-point control of current carried out in a stationary stator coordinate system and a direct control of torque where the modulation method has to be changed according to the direction of rotation. In addition, three different modulations may be applied in some applications in both directions of rotation.

Compared with the methods for controlling current, another problem related to direct control of torque is that the current in the motor cannot be directly influenced because the inverter output voltages are generated directly on the basis of the desired flux and torque. The extent to which the equipment can be loaded depends, however, usually specifically on the maximum load the equipment can sustain. In direct control of torque, currents which are too high will therefore have to be prevented by changing, when necessary, the reference values for the flux and the torque, whereas in current control this can be carried out by directly restricting the reference values of the current.

BRIEF DESCRIPTION OF THE INVENTION

It is an object of the present invention to provide an inverter control method that allows the above shortcomings to be avoided and, in addition, provides an inverter control method that is simpler than previous methods. This is achieved with a method of the invention which is characterized in that the method further comprises the steps of: determining a voltage vector as a sum of the product of the inverter load resistance and its output current vector and a voltage proportional to the electromotive force of the load; forming a direction vector on the basis of a current vector of the inverter reference value and the inverter output current vector; determining a space coordinates system $\mu\upsilon$ associated with the voltage vector and having a real axis $\mu$ which is co-directional with the current vector; determining the direction vector in the $\mu\upsilon$ coordinates system; and forming inverter switch commands on the basis of a direction vector component co-directional with the $\mu$ axis and a direction vector component co-directional with the $\upsilon$ axis.

The method of the invention is based on the idea that inverter control operations are carried out in a coordinate system associated with a voltage vector constituted by an inductive load containing an active voltage source. The length and phase angle of such a voltage vector vary automatically according to the operating point of the machine load. Consequently, the method of the invention allows a desired inverter output voltage vector to be always selected, irrespective of the operating point, directly on the basis of comparisons made between two-point controllers, without the complex selection logic employed by current methods.

Since the sign of the angular speed is indicated, the calculation of the voltage vector to be employed also takes into account of the direction of rotation, and therefore the selection logic for the switch position does not need to be changed even when the direction of rotation changes. With regard to precision and speed of control operations, the modulation of the invention which is based on voltage orientation allows a better end result to be obtained than before, and with simpler equipment than today.

The invention provides greatest advantages in applications where the operating point varies significantly, i.e. mainly when used in electric motors. As regards network inverters, where the network voltage and frequency are approximately constant, even current methods can be successfully optimized. Since the method of the invention is based on current control, the invention allows, however, sinusoidal phase currents to be achieved extremely well in network inverters.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

In the method of the invention, which is based on voltage orientation, problems related to modulation methods are solved by associating comparisons of a two-point controller to voltage vector b̄ which is defined according to equation (6). In accordance with the method of the invention, current vector $\bar{i}_{olo}$ of the inverter output, flux vector $\bar{\psi}$ of the load, angular speed ω of the inverter load and inverter load resistance R are defined to allow voltage vector b̄ to be calculated. The output current vector can be defined directly, by measuring, or possibly by applying a model of the inverter load, the model being typically used also for defining the flux vector. Load resistance can be determined for example when the inverter is being taken in use or, alternatively, as an automated routine executed always at the initial phase of the inverter drive. The angular speed of load can also be determined using the load model, or by using, when necessary, an extremely accurate and reliable control carried out by using a sensor suitable for the purpose, such as a pulse tachometer. Voltage vector $\overline{b}$ is thus defined as the sum of the product of resistance R and current vector $\overline{i}_{olo}$ and a voltage proportional to the electromotive force of the load.

According to a preferred embodiment of the invention, the voltage proportional to the electromotive force of the load comprises motion voltage $j\omega\overline{\psi}$, voltage vector $\overline{b}$ thus being expressed by an equation where $\overline{b}=R\overline{i}+j\omega\overline{\omega}$. According to another preferred embodiment of the invention, the voltage proportional to the electromotive force of the load further includes a voltage proportional to the inversion voltage, which further enhances the accuracy of voltage vector $\overline{b}$.

Figure 3:
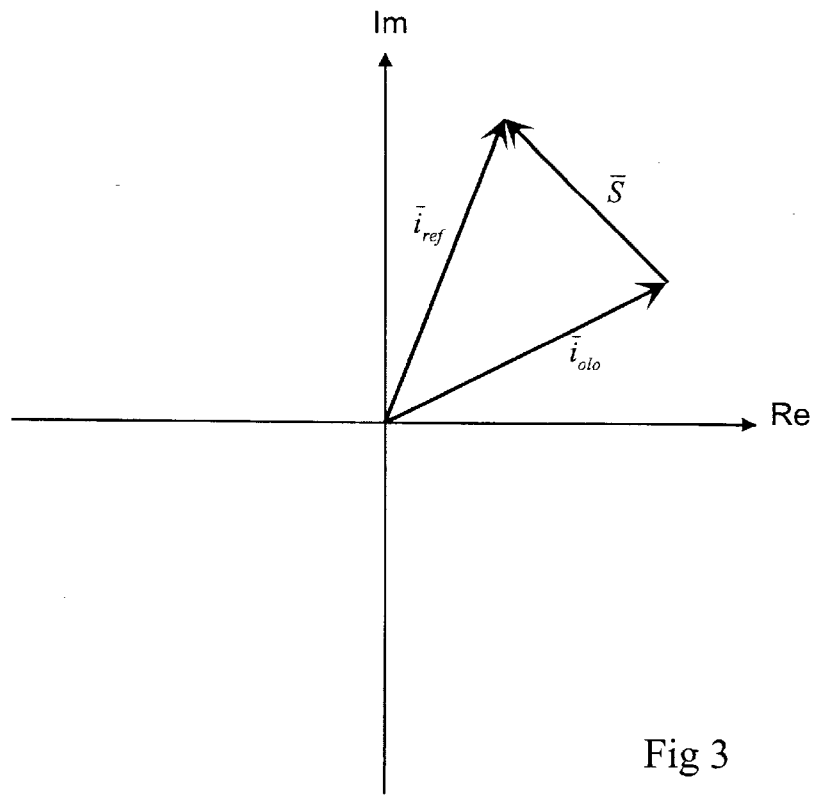
FIG. 3 illustrates the formation of direction vector S̄.

In the method of the invention, direction vector $\overline{S}$ is determined on the basis of reference value current vectors $\overline{i}_{ref}$ and $\overline{i}_{olo}$. The direction vector is preferably determined as the difference of said current vectors. For example, when reference value vector $\overline{i}_{ref}$ formed of current component reference values calculated in the field coordinate system and real value vector $\overline{i}_{olo}$ based on measured currents are expressed in the same coordinate system, the difference between these vectors provides the direction vector $$\overline{S}=\overline{i}_{ref}-\overline{i}_{olo}, \quad (7)$$

into the direction of which current will have to be turned to achieve the reference values. FIG. 3 shows an example of the forming of direction vector $\overline{S}$ for the current. When the modulation method of the invention is applied, the length of the direction vector is not significant; the vector obtained on the basis of the difference can be multiplied, for example, by a constant number to obtain the final direction vector $\overline{S}$. Modulation according to the method of the invention can be carried out on the basis of the position angle of the direction vector alone.

Figure 4:
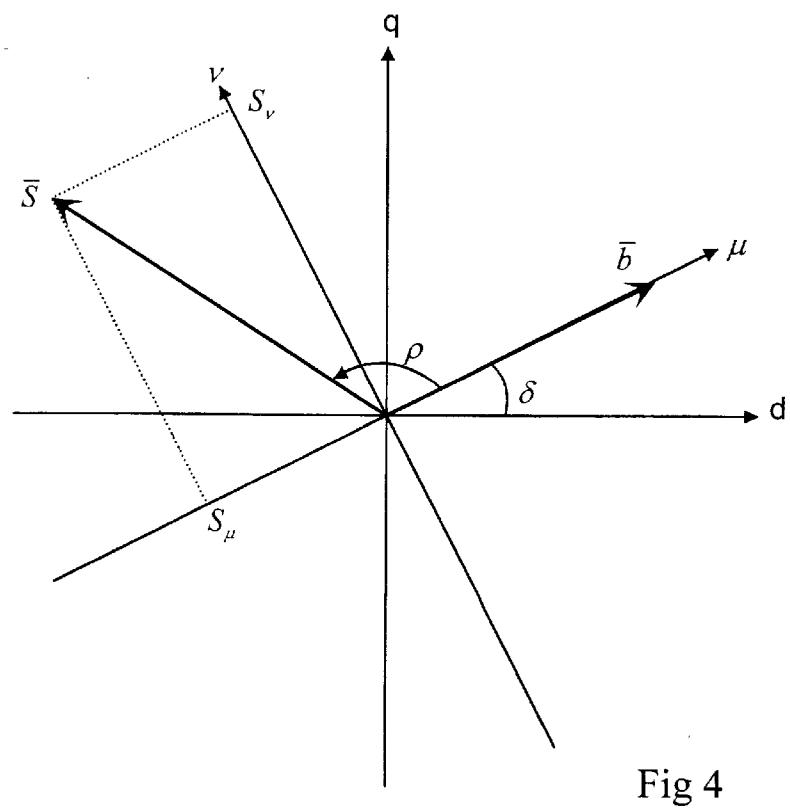
FIG. 4 illustrates the principle of modulation according to the invention.

In accordance with the invention, a new coordinate system associated with voltage is defined, the coordinate system's real axis that has the same direction as voltage vector $\overline{b}$ being denoted with symbol $\mu$ and the imaginary axis perpendicular to the real axis with symbol v. Vector $\overline{S}$ can be expressed in this $\mu v$ coordinates system by modifying the coordinate system, if the vector in question is not defined in the coordinates system concerned. If both the vectors, $\overline{S}$ and $\overline{b}$, are already known in some other coordinate system, then the easiest way to obtain the $\mu$ and v components of vector $\overline{S}$ is to calculate the scalar and cross products of the vectors in the prior art manner. FIG. 4 illustrates the principle of the voltage-oriented modulation according to the invention.

Figure 1:
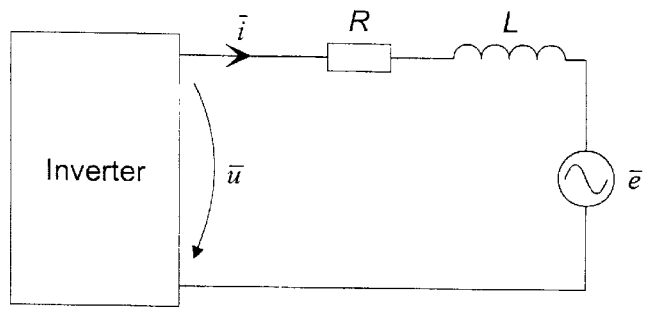
FIG. 1 illustrates a typical equivalent circuit of an inverter.
Figure 2:
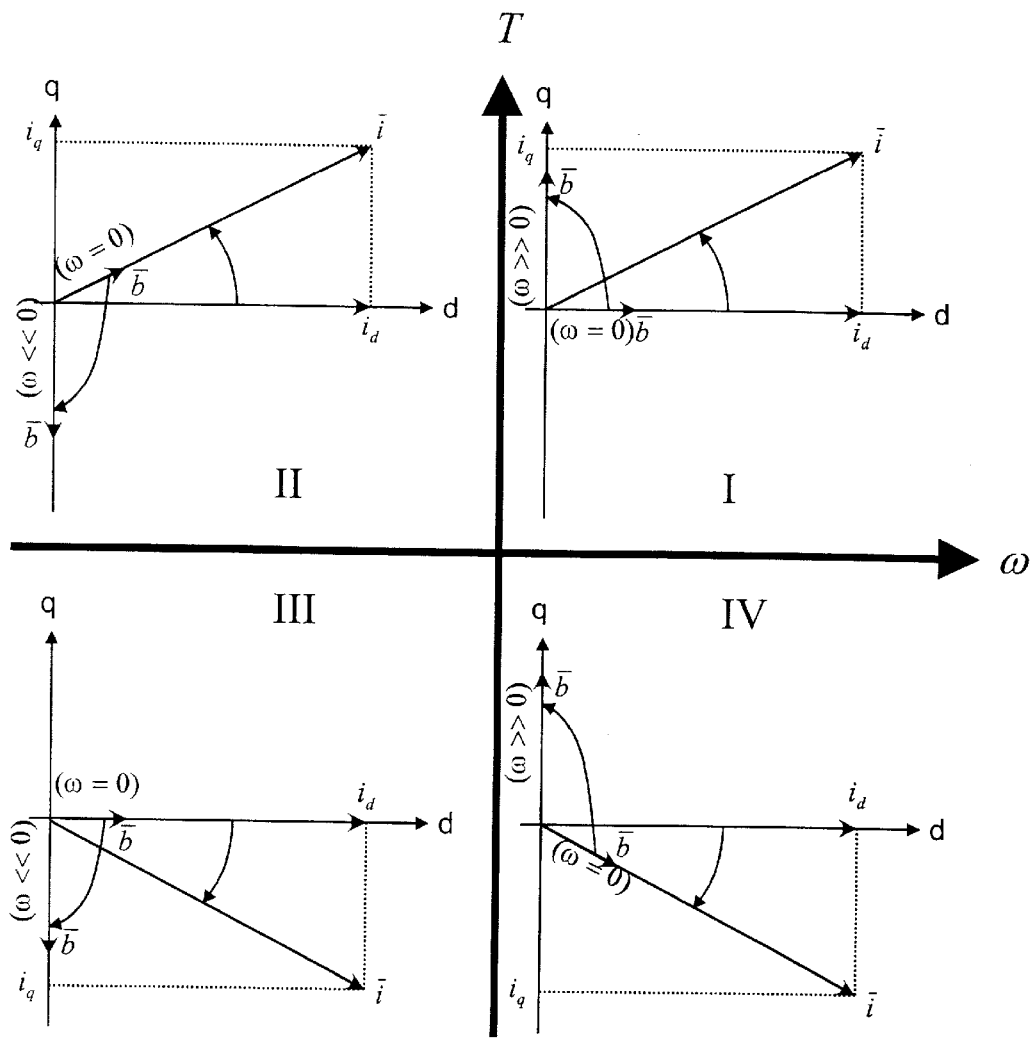
FIG. 2 illustrates the behavior of current vector ī and voltage vector b̄ with regard to a field coordinate system in different operating points of a machine.

The vertex of direction vector $\overline{S}$ formed of the difference between the reference value vector $\overline{i}_{ref}$ and the real value vector $\overline{i}_{olo}$ can naturally be located in one of the quadrants of the dq plane. Voltage vector $\overline{b}$, in turn, can be located in quadrant I or IV of the dq plane, because the angle between the d-axis and vector $\overline{b}$ varies within $-90°<\delta<90°$, as shown in FIG. 2. Symbol $\rho$ denotes the angle between vectors $\overline{S}$ and $\overline{b}$.

According to the invention, the inverter switch commands are formed on the basis of rectangular components $S_\mu$ and $S_v$ of direction vector $\overline{S}$. The selection of the inverter output voltage is significantly simplified when the comparisons of the two-point controls are made on the basis of the directions of the $\mu$ and v axes. Components $S_\mu$ and $S_v$ of vector $\overline{S}$ always allow an inverter output voltage to be directly selected that is in the right direction with regard to vector $\overline{b}$ and thus moves the current to the desired direction. The control naturally aims at obtaining a zero value for the components of vector $\overline{S}$.

To select a switch position that changes the current to the desired direction, in all operating points of the machine, it is in principle sufficient that the phase angle of vector $\overline{b}$ is known in the same coordinate system where the output voltage vectors of the inverter are determined. Almost without exception these output voltage vectors and the respective switch positions are determined in a stationary stator coordinate system. In addition to the phase angle of vector $\overline{b}$, at least the signs of components $S_\mu$ and $S_v$ of the direction vector need to be known to allow the control to be implemented. According to a preferred embodiment of the invention, the switch commands are formed on the basis of the absolute values and the signs of the components of the direction vector. In the preferred embodiment of the invention, the absolute values of the components, i.e. their lengths, can be utilized in two-point control where hysteresis limits have been added around the reference values. The hysteresis limits define the accepted range of variation for the real value and thereby affect the switching frequency of the switching components in two-point control. Hysteresis also allows to define a threshold for changing from modulation of a stationary state to dynamic state modulation. A criteria for the change may be for example a significant and often occurring exceeding of hysteresis limits.

In the method of the invention, the actual modulation is carried out on the basis of component $S_\mu$ of the $\mu$ direction because it is used for deciding whether the inverter output will be connected next to zero or whether a voltage vector deviating from zero will be used. Component $S_v$ is only used for selecting from which side of vector $\overline{b}$ the output voltage vector to be used will be selected, when one is needed.

When a stationary state of operation is concerned, the output voltage vector that is closest to vector $\overline{b}$ in the direction determined by components $S\mu$ and $S_v$ is preferably selected, because this minimizes the change in the current, as defined in equation (5). This selection thus provides the most uniform current and thereby the most uniform torque as well.

In a dynamic, changing situation, for example in connection with great instantaneous changes in the reference values, the most advantageous choice is an output voltage that maximizes the change of the current to the desired direction.

It is apparent to a person skilled in the art that as technology advances, the basic idea of the invention can be implemented in various ways. The invention and its embodiments are therefore not restricted to the above described examples but they may vary within the scope of the claims.

What is claimed is:

1. A method for controlling an inverter which comprises the switching components to be controlled, the method comprising the steps of
    determining a current vector for the inverter output;
    determining a flux vector for the inverter load;
    determining an angular speed for the inverter load;
    determining a resistance for the inverter load, wherein the method further comprises the steps of
    determining a voltage vector as a sum of the product of the inverter load resistance and its output current vector and a voltage proportional to the electromotive force of the load;

forming a direction vector on the basis of a current vector of the inverter reference value and the inverter output current vector;

determining a space coordinate system $\mu\nu$ associated with the voltage vector and having a real axis $\mu$ which is co-directional with the voltage vector;

determining the direction vector in the $\mu\nu$ coordinate system; and forming inverter switch commands on the basis of a direction vector component co-directional with the $\mu$ axis of the direction vector and a component co-directional with the $\nu$ axis.

2. A method according to claim 1, wherein the forming of the direction vector comprises a phase where the direction vector is formed in proportion to the difference between the reference value current vector and the output current vector.

3. A method according to claim 1, wherein the forming of the inverter switch commands comprises a phase where the switch commands are formed on the basis of the absolute values and the signs of the component co-directional with the $\mu$ axis of the direction vector and the component co-directional with the $\nu$ axis.

4. A method according to any one of claim 1, wherein the voltage proportional to the electromotive force of the load comprises a motion voltage.

5. A method according to claim 4, wherein the voltage proportional to the electromotive force of the load further comprises a voltage proportional to an inversion voltage.

* * * * *